United States Patent [19]

Neumann

[11] Patent Number: 4,469,970
[45] Date of Patent: Sep. 4, 1984

[54] ROTOR FOR PERMANENT MAGNET EXCITED SYNCHRONOUS MOTOR

[75] Inventor: Thomas W. Neumann, Burnt Hills, N.Y.

[73] Assignee: General Electric Company, Schenectady, N.Y.

[21] Appl. No.: 334,352

[22] Filed: Dec. 24, 1981

[51] Int. Cl.³ .......................................... H02K 21/12
[52] U.S. Cl. ................................. 310/156; 310/162; 310/216; 310/261
[58] Field of Search ............... 310/156, 211, 212, 217, 310/216, 218, 269, 112, 114, 42, 261, 262, 264, 265, 91, 162, 163, 164, 267, 40 MM; 324/146

[56] References Cited

U.S. PATENT DOCUMENTS

| | | | |
|---|---|---|---|
| 2,139,748 | 12/1938 | Harrell | 310/211 |
| 2,242,008 | 5/1941 | Leader | 310/212 |
| 2,944,171 | 7/1960 | Alger | 310/211 |
| 3,956,650 | 5/1976 | Field | 310/162 |
| 4,127,786 | 11/1978 | Volkrodt | 310/156 |
| 4,139,790 | 2/1979 | Steen | 310/156 |
| 4,362,959 | 12/1982 | Bartheld | 310/211 |

*Primary Examiner*—R. Skudy
*Attorney, Agent, or Firm*—Mark L. Mollon; James C. Davis, Jr.; Marvin Snyder

[57] ABSTRACT

A permanent magnet rotor is made of a lamination stack having parts formed of a material of high permeability surrounding a shaft and extending radially outward with respect to the shaft, separated by interpolar regions of low magnetic permeability. A plurality of magnets are also included. These components are mechanically contained by the conductors of a starter cage. At least one strength lamination comprised of a magnetic material is stacked with the lamination stack and has an area which is coextensive with the areas of the rotor components. The strength lamination has interpolar bridge portions with cross-sectional areas sufficiently small to minimize interpolar flux leakage. The use of strength laminations periodically interspersed within the lamination stack greatly increases rotor strength without greatly increasing the total flux leakage in the rotor.

17 Claims, 6 Drawing Figures

ROTOR FOR PERMANENT MAGNET EXCITED SYNCHRONOUS MOTOR

BACKGROUND OF THE INVENTION

This invention relates to permanent magnet excited synchronous motors. More particularly, it relates to a rotor for such a motor in which high strength is achieved while flux leakage is minimized.

Centrifugal and magnetic forces in a motor tend to force the components of a spinning rotor away from its axial center line. Structures are therefore provided to support or contain these components under the action of such forces. However, these structures may tend to interfere with many properties of the rotor.

In many machines, especially those of small size which operate at relatively low rotational speeds, the conductors of the squirrel or starter cage, which generally extend axially through the rotor pole assembly from one end cap to another end cap, provide sufficient mechanical strength to hold the components of the rotor together. In many applications, however, additional support members are required. The additional support members are used to provide either radial support or circumferential support. When the added support members are of magnetic material having a radial extent, they create leakage flux paths across the permanent magnets. When the added supports are of magnetic material and have circumferential extent, they by-pass the low permeability interpolar gaps of the rotor. Either type of leakage path reduces the total useful flux density of the rotor thus reducing the total amount of torque available for a given size machine or investment in machine materials.

U.S. Pat. No. 4,139,790 to Steen discloses the use of non-magnetic strength laminations for containment. This type of design requires the use of an additional and more expensive rotor material such as stainless steel. Since non-magnetic laminations extends from the shaft to the outside of the rotor, a flux leakage path along the entire magnet width at the location of each non-magnetic lamination is created. In addition, since non-magnetic laminations extend out to the periphery of the rotor, that is, to the air gap between the rotor and the stator, the effective area for carrying flux across the air gap is reduced. Therefore, regions of the low flux concentration in the air gap are created thus decreasing the flux capability of the rotor and, reducing the ability of the rotor to generate torque. If a series of modular substacks are used, the design limits the length of the active portion of the rotor to integral multiples of the length of these substacks.

U.S. Pat. No. 4,127,786 to Volkrodt discloses the use of axially disposed bolts extending through the lamination stack and non-magnetic strength laminations for containment. In addition to the disadvantages discussed with respect to the use of non-magnetic strength laminations in the Steen patent, this requires additional parts and manufacturing steps.

Other approaches for providing strength in a rotor assembly include the use of bimetallic shrink rings, and a magnetic shunt through the magnet and rotor iron at the rotor periphery. Bimetallic shrink rings require expensive materials, are expensive to manufacture and result in non-laminated pole faces thus leading to high pole face losses. Magnetic shunts through the magnet present an iron flux leakage path along the entire machine length. In addition, machining tolerances are of the order of the dimensions of these shunts. The radial thickness of rotor iron at the rotor periphery is generally very small and comparable to machining tolerances. Such rotor iron also presents an iron flux leakage path along the entire machine length.

The above-mentioned approaches have been used successfully in machines where the mechanical and magnetic forces are extremely high. In these applications, simplicity of manufacturing and cost limitations are generally not extremely important considerations and can be sacrificed in order to obtain the desired performance.

SUMMARY OF THE INVENTION

In this invention, the mechanical rigidity necessary to contain the rotor is provided by strength laminations of magnetic material which may be axially spaced along the rotor lamination stack. For example, appproximately one in every ten laminations may be a strength lamination. These strength laminations are comprised of a material of high permeability which is preferably the same material from which the laminations are formed. They are provided with small cross-sectional regions which bridge the interpolar regions of the rotor. Since the area of these regions is small, the regions are easily saturated and flux leakage through the regions is thereby minimized. The strength members provide circumferential or ring support and thus need not cross the magnets themselves as would be the case for radial supports which would thereby introduce further flux leakage. In an embodiment of the invention, all laminations in the stack can have a very small strength bridge. However, by concentrating the iron cross-section necessary to contain the rotor in only a few of the axially spaced strength laminations rather than among the many rotor laminations along the entire stack length, tolerances become a much less significant part of critical strength dimension. Therefore, it is not necessary to overdesign the containment members in order to assure a safe construction.

In the present invention, at least one strength lamination comprised of a magnetic material is disposed axially along the lamination stack and has interpolar bridge portions with a cross-sectional area sufficiently small to minimize interpolar flux leakage. The conductors of a squirrel or starter cage which extend through aligned openings in the laminations may cooperate with the strength laminations to resist the centrifugal and magnetic forces to which the rotor is exposed during operation thus holding the rotor together.

BRIEF DESCRIPTION OF THE DRAWINGS

For the purpose of illustrating the invention, there is shown in the drawings several embodiments which are presently preferred, it being understood, however, that the invention is not limited to the precise arrangements and instrumentalities shown.

DETAILED DESCRIPTION OF THE DRAWINGS

Figure 1:
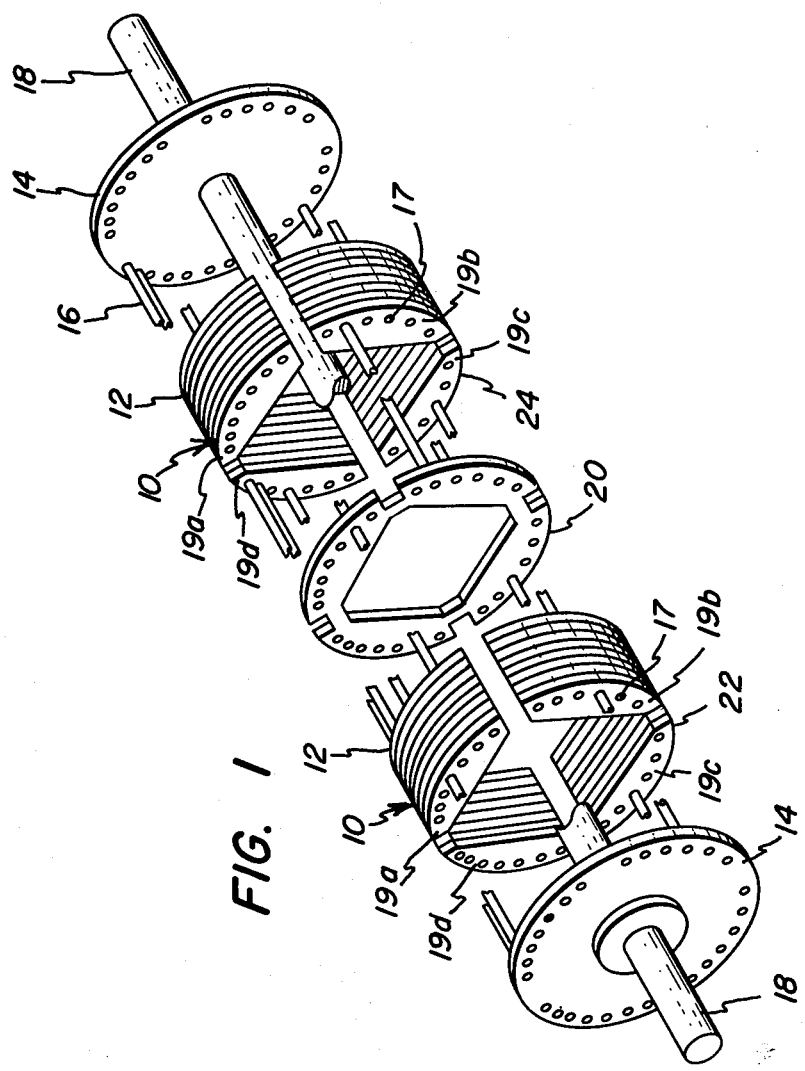
FIG. 1 is an exploded view of a rotor according to one embodiment of the invention.

Referring now to the drawings, wherein like numerals indicate like elements, there is shown in FIG. 1 a rotor comprised of a stack of laminations 10 which form separate subassemblies 12 which comprise the magnetic poles of the rotor. Each lamination in stack 10 is comprised of a thin sheet of relatively high permeability material such as a conventional transformer steel, which may be stamped from a sheet by conventional forming means. A starter cage, which may be included to provide torque at non-synchronous speeds, comprises conductor end caps 14 which are affixed to shaft 18 and support between them axially extending conductors 16, which pass through aligned openings 17 in lamination subassemblies 12. Conductors 16 support lamination subassemblies 12 and the other components of the rotor, which are not shown, relative to one another as is well known in the art. Subassemblies 12 and these other components which comprise permanent magnets and, in some cases, a rotor yoke, are disposed in a fixed relationship surrounding shaft 18 which extends along the entire length of the rotor.

In rotors in which the starter cage or, more particularly, conductors 16 of the starter cage are not sufficiently strong to contain the components of the rotor against the centrifugal and magnetic forces that these components undergo, then, in accordance with the invention, at least one strength lamination 20 is provided along the length of the lamination stack to aid in holding the assembly together.

Strength lamination 20 divides the lamination stack into substacks 22 and 24, thus reducing the axial distance along the lamination stacks which are supported solely by the conductors 16.

If a rotor cage is not included, such as in cases where the rotor is brought up to synchronous speed by an auxiliary motor, any axially extending members which pass through openings 17 and extend from at least one strength lamination to the next may be used to retain the laminations in the lamination stacks.

As more fully explained with reference to FIG. 2, laminations 11 formed of four parts 19a, 19b, 19c and 19d are comprised of a material of high permeability, such as a conventional magnet steel, which makes up the poles of the rotor. These poles are excited by permanent magnets 30 disposed in magnet receiving regions of the poles. Permanent magnets 30 may be comprised of rare earth materials, ferrites or magnesium aluminum alloys. Such permanent magnets are well known in the art and the selection of a particular variety of magnet is a design consideration well known to those skilled in the art. The term permanent magnet is used broadly, however, and may include direct current excited electromagnets.

Figure 2:
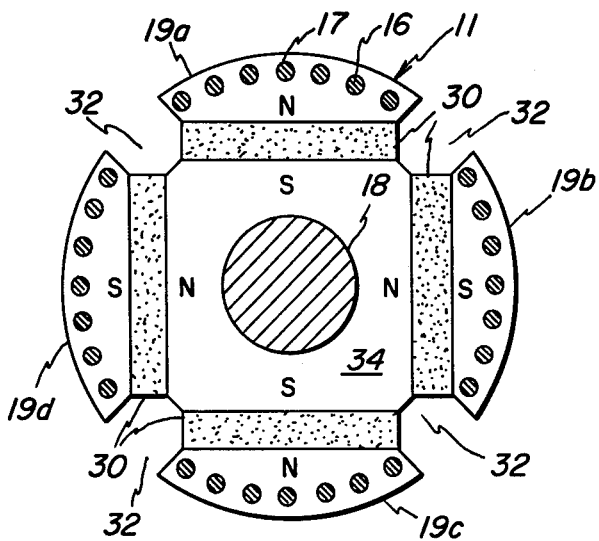
FIG. 2 is a cross-sectional view taken in a plane perpendicular to the rotor shaft through the lamination stack of a rotor of conventional design.

In the embodiment shown in FIG. 2, magnets 30 comprise a structure of polygonal cross-section surrounding and covering most of the surface of a rotor yoke 34 which surrounds and is fixed to shaft 18. The interpolar regions 32 form gaps in this structure. Yoke 34 may be of a single piece construction or laminated construction, but in either case is comprised of a material of high permeability such as a magnet steel. Shaft 18 is also, in this embodiment, preferably comprised of a material of high permeability. Since magnets 30 are radially magnetized, rotor yoke 34 and shaft 18 are parts of the magnetic circuit of the rotor.

Interpolar regions 32 are low permeability regions and are either air gaps or are filled with materials of low permeability. In a conventional design, the entire structure is held together by conductors 16 passing through openings 14 in lamination subassemblies 12.

Figure 2A:
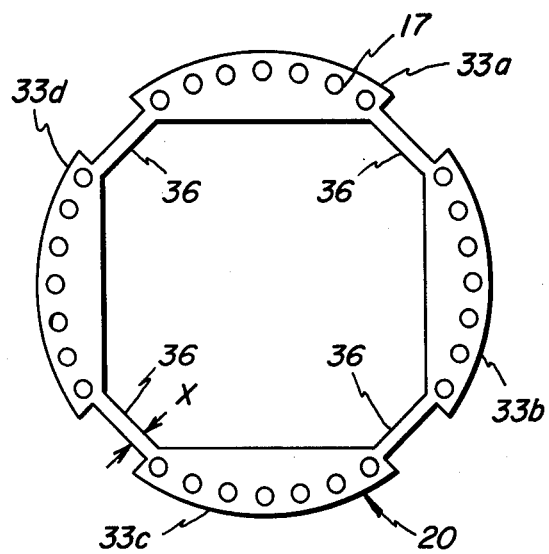
FIG. 2A illustrates a strength lamination support which may be used in the lamination stack of FIG. 2 to produce a rotor according to the invention.

According to the invention, at least one strength lamination 20, as illustrated in FIG. 2A, is provided in the lamination stack. Strength lamination 20 may have a planar configuration which is identical to the planar configuration of lamination 10 except for the addition of bridge portions 36 which span the interpolar regions 32 to rigidly connect sections 33a, 33b, 33c and 33d which correspond to the four pole pieces of the rotor. Openings 17 are provided in each of sections 33a to 33d for receiving the axially disposed conductors 16 of the starter cage. Strength lamination 20 is comprised of a material of high permeability which is preferably the same material as that of subassemblies 12. Typically, such lamination parts are cut or stamped from a sheet of magnet steel between 0.014 inch (0.36mm) and 0.025 inch (0.64mm) in thickness depending upon design considerations such as the size and rating of the machine.

Bridge portions 36 have a radial thickness or dimension X of less than about 0.03 inch (0.89 mm) so that they are quickly saturated by interpole flux.

Figure 3:
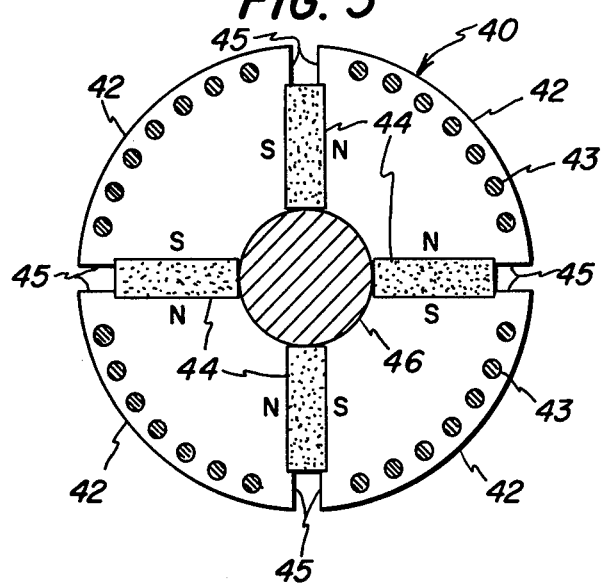
FIG. 3 is similar to FIG. 2 but illustrates an alternate embodiment of a conventional rotor stack.

Referring to FIG. 3, an alternate design for a conventional rotor is shown. The laminations 40 form pole assemblies 42. Permanent magnets 44 are disposed within magnet receiving regions and, together with pole assemblies 42, form a continuous annular structure surrounding shaft 46. A starter or squirrel cage has conductors extending through aligned openings 43 in the pole assemblies 42 to hold adjacent laminations together. The magnets 44 are circumferentially magnetized, requiring that shaft 46 be comprised of a material of low permeability such as a stainless steel to prevent flux leakage. Shoulders 45 are provided in lamination assemblies 42 to hold magnets 44 in place against centrifugal force.

Figure 3A:
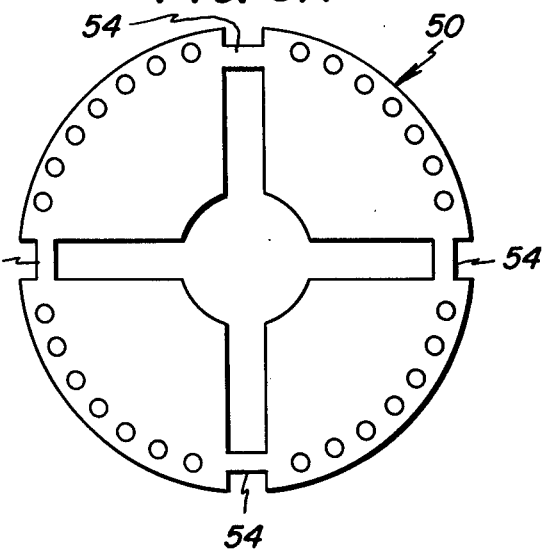
FIG. 3A illustrates a strength lamination which may be used in the rotor of FIG. 3 to produce a rotor according to the invention.

In accordance with the invention a strength lamination 50, shown in FIG. 3A, is provided in the rotor constructed according to FIG. 3. Strength lamination 50 has a planar configuration identical to that of laminations 40 shown in FIG. 3 with the exception of the provision of bridge portions 54. Strength lamination 50 is constructed according to the principles outlined for strength lamination 20 of FIG. 2A and performs in essentially the same manner. Thus, while bridges 54 span the interpolar regions, the bridges have a very small cross-section and are easily saturated. Therefore, leakage flux through regions 54 is limited.

Bridge portions 54 are also advantageously used to hold magnets 44 in place. If magnets 44 are formed of several magnet sections placed end to end axially along the lamination stack, strength laminations 50 are preferably not placed precisely at the junction of these magnet sections.

Figure 4:
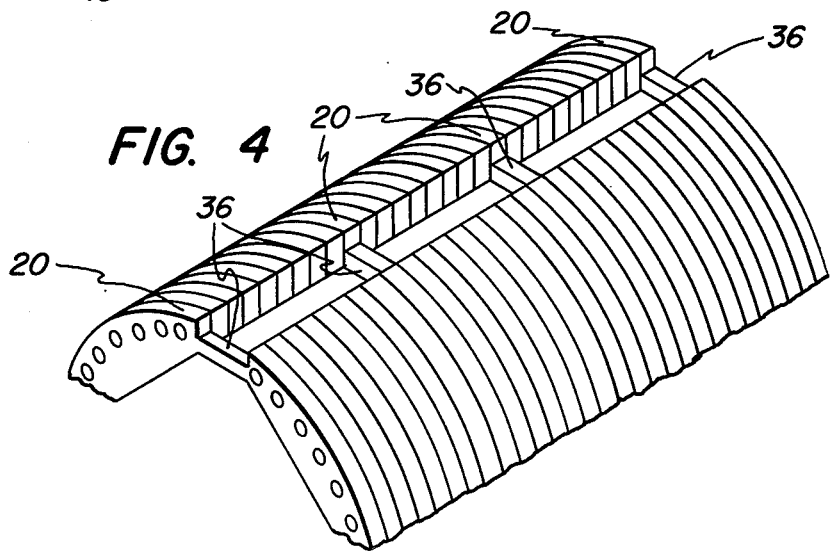
FIG. 4 is a perspective view of a portion of a rotor constructed according to the invention and employing the laminations of FIGS. 2 and 2A.

The strength laminations of FIGS. 2A and 3A will be distributed along their respective stack as desired to meet the necessary strength requirements of the stack. By way of example, strength lamination 20 of FIG. 2A can be arranged as shown in FIG. 4. The lamination stack shown in FIG. 4 is divided into three substacks by four strength laminations 20. A strength lamination 20 may be located between groups of five to fifteen laminations. Preferably, one lamination 20 will be located between groups of ten laminations. The conductors 16 will generally have adequate strength to hold the ten laminations in place relative to one another.

The total cross-sectional area of bridge portions 36 or 54, particularly in larger machines, can be distributed among all the laminations rather than in selected strength laminations in the stack. For rotors according to the invention which are of smaller size or operate at lower rotational speeds and therefore are exposed to lower stresses, however, this would require an extremely small cross-sectional area for each lamination to maintain a sufficiently low leakage resistance. The dimensions of the bridges in these lower stress rotors would generally approach the tolerances for the components used in a rotor. Therefore it would be necessary in these lower stress rotors to oversize the material, thus producing excessive flux leakage.

In addition to the advantages discussed above, it should be noted that because the bridging portions 36 or 54 of the strength laminations are located in the interpolar region but far from the periphery of the rotor, the effects that they produce can be easily analyzed by appropriate mathematical models. In addition, since the rotor magnetic configuration for most of the length of the lamination stack is very close to ideal, conventional engineering models will be extremely accurate in predicting machine performance.

It will be understood by one skilled in the art that the construction principles outlined above may be applicable to other types of rotors than described herein.

It is understood that the foregoing detailed description is given merely by way of illustration and that many modifications may be made without departing from the spirit or scope of the present invention.

What is claimed is:

1. A multi-pole rotor for a synchronous motor comprising:
   a central rotor shaft having a longitudinal axis;
   a stack of thin laminations disposed in planes perpendicular to said axis and forming a plurality of subassemblies, said subassemblies comprising the respective poles of the rotor, said thin laminations having high magnetic permeability, said subassemblies being disposed circumferentially around said shaft with circumferentially adjacent subassemblies separated from one another by axially extending interpolar regions of low magnet permeability, said poles having a circumferential surface;
   magnetic means associated with said plurality of subassemblies or producing magnet flux which flows through the circumferential surface of the poles of the rotor;
   at least one strength lamination for dividing said stack in the axial direction into substacks comprised of high permeability material, said strength lamination having a planar configuration which substantially conforms to that of said laminations, said strength lamination having interpolar bridge portions with a cross-sectional area sufficiently small to minimize interpole flux leakage and to hold the subassemblies against centrifical force, said strength lamination defining an aperture therethrough for said magnet means; and
   means for retaining the thin laminations, between strength laminations, extending axially along said lamination stack from at least one strength lamination to the next, through aligned openings in said stack.

2. The rotor of claim 1 in which the magnetic means are magnetized in the radial direction with respect to said shaft.

3. The rotor of claim 2 further comprising a rotor yoke comprised of a material of high magnetic permeability affixed to and surrounding said shaft, said magnetic means being disposed between said yoke and said stack of laminations and said strength lamination, said yoke being a part of a magnetic circuit of said rotor assembly.

4. The rotor of claim 3 in which said rotor yoke is comprised of a separate stack of laminations of material of high permeability.

5. The rotor of claim 3 in which said magnetic means is comprised of a plurality of magnets which form a polygonal structure substantially surrounding said yoke, said interpolar regions being gaps in said polygonal structure.

6. The rotor of claim 1 in which said shaft is comprised of a material of high magnetic permeability and forms part of a magnetic circuit of said rotor assembly.

7. The rotor of claim 1 in which the magnetic means comprises magnets circumferentially magnetized with respect to said shaft.

8. The rotor of claim 1 in which said shaft is comprised of a material of low permeability and said magnetic means is comprised of a plurality of magnets which extend radially from said shaft.

9. The rotor of claim 1 in which said thin laminations and said magnetic means form a continuous annular structure surrounding said shaft.

10. The rotor of claim 1 in which said strength lamination comprised between one of every five and one of every fifteen thin laminations in said stack.

11. The rotor of claim 1 in which said means for retaining the thin laminations comprises an axially extending conductor of a starter cage.

12. The rotor of claims 1 or 10 in which the bridge portions of said strength laminations are magnetically saturated.

13. The rotor of claims 1 or 10 in which the strength laminations and thin laminations are comprised of the same material.

14. The rotor of claim 1 in which said interpolar bridge portions cross portions of said interpolar regions remote from the periphery of said rotor.

15. The rotor of claim 1 in which said magnetic means comprises permanent magnets.

16. A strength lamination comprised of a material of high permeability for a multi-pole permanent magnet rotor having a plurality of lamination stack subassemblies disposed in planes perpendicular to a central shaft and magnetic means extending axially therethrough, said plurality of subassemblies circumferentially surrounding and fixed with respect to said shaft and forming a series of planar lamination arrays which comprise the poles of the rotor, said strength lamination comprising:
   (a) a plurality of pole regions each having a planar configuration which substantially conforms to the respective planar configuration of the planar lamination arrays, said pole regions being adapted to circumferentially surround said shaft;

(b) interpolar bridge portions integral with said pole regions, each of said bridge portions having a cross-sectional area sufficiently small to minimize interpolar flux leakage; and (c) a series of openings in said pole regions adapted to receive axial numbers which extend through said strength lamination and serve to retain said laminations stack subassemblies on said rotor when said strength lamination is situated such that said pole region circumferentially surround said shaft.

17. The strength lamination of claim 16 wherein the composition of said material is substantially identical to the composition of individual laminations in said lamination stack subassemblies.

* * * * *